United States Patent [19]
Grabb

[11] 3,910,047
[45] Oct. 7, 1975

[54] TWO STAGE SERVOMOTOR WITH SMOOTH ACTUATION SEQUENCE

[75] Inventor: Frederick G. Grabb, South Bend, Ind.

[73] Assignee: The Bendix Corporation, South Bend, Ind.

[22] Filed: June 20, 1974

[21] Appl. No.: 481,432

[52] U.S. Cl. ................................ 60/554
[51] Int. Cl.² ................... F15B 7/00; F15B 7/08
[58] Field of Search ............ 60/553, 562, 547, 554, 60/581, 549, 556, 560, 565, 563

[56] References Cited
UNITED STATES PATENTS

| | | | |
|---|---|---|---|
| 2,666,294 | 1/1954 | Porter | 60/576 |
| 2,968,926 | 1/1961 | Randol | 60/553 |
| 3,033,324 | 5/1962 | Lepelletier | 60/576 X |
| 3,062,011 | 11/1962 | Brooks | 60/576 X |
| 3,408,815 | 11/1968 | Stelzer | 60/553 |
| 3,416,314 | 12/1968 | Cripe | 60/549 |

Primary Examiner—Martin P. Schwadron
Assistant Examiner—H. Burks, Sr.
Attorney, Agent, or Firm—Leo H. McCormick, Jr.; William N. Antonis

[57] ABSTRACT

A control valve is activated by a first plunger upon movement of an input push rod to develop a pressure differential across a movable wall which produces an output force. This output force is carried through a first piston on which a concentric second piston is retained between a first stop and a second stop. A spring urges the second piston toward the first stop in opposition to a first hydraulic pressure developed by the second piston moving in a pressurizing chamber. When the first hydraulic pressure is sufficient to hold the second piston against the second stop a ball valve connected to an output chamber is closed. The first hydraulic pressure will unseat the first ball valve until an input force moves a second plunger to proportionally open a poppet valve and allow a portion of the first hydraulic pressure to escape into a relief chamber. As the first hydraulic pressure is reduced, the movable wall moves the first piston in the output chamber to develop a second hydraulic pressure.

10 Claims, 3 Drawing Figures

U.S. Patent   Oct. 7, 1975   3,910,047
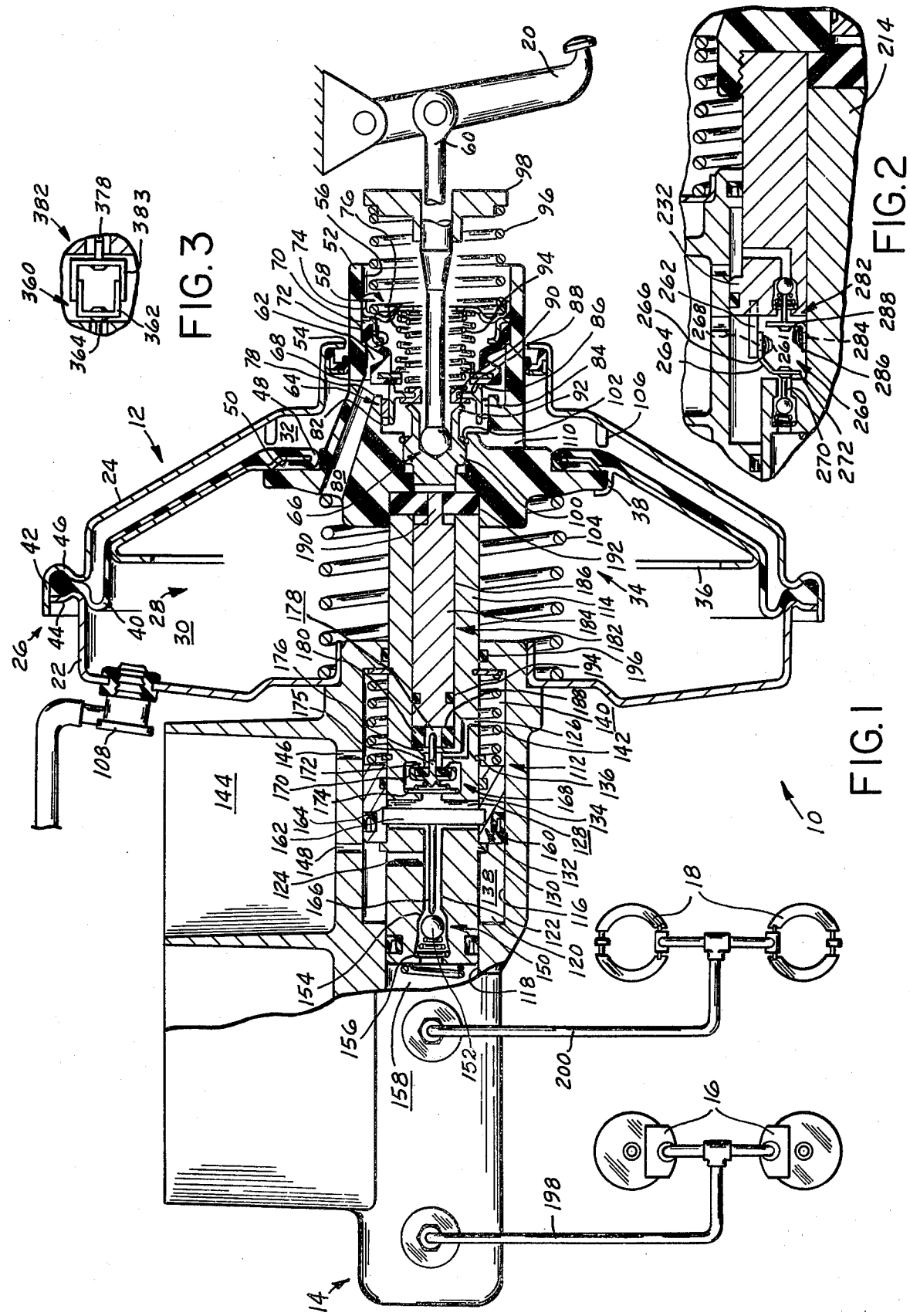

TWO STAGE SERVOMOTOR WITH SMOOTH ACTUATION SEQUENCE

BACKGROUND OF THE INVENTION

In U.S. Pat. No. 3,559,406, incorporated herein by reference, it is disclosed how concentric pistons can be utilized within a servomotor to develop an increased output when a desired braking force exceeds that which can be generated by a pressure differential acting across a wall in the servomotor. The concentric pistons are simultaneously moved by the pressure differential developed within the servomotor until vacuum runout occurs, after which one of the pistons moves independently of the other in response to manual input to supply a master cylinder with an additional operational force. However, the additional operational force will act on both the first and second concentric pistons to reduce the effect of the manual input by changing the volume of the pressure chamber within the master cylinder.

In copending U.S. application Ser. No. 481,434, filed June 20, 1974, it is disclosed how the movement of this second piston could actuate a valve to lock the first piston in a stationary location upon individual movement of the second piston to obtain a maximum direct output force from the input force.

In copending U.S. application Ser. No. 481,435, filed June 20, 1974, it is disclosed how a first pressure force developed during movement of the concentric pistons in response to the servomotor output can be modified upon the individual movement of a single piston which sequentially closes a first valve between the pressurizing chamber and the output chamber and opens a second valve to a relief chamber to shift the servomotor output to the single piston from which a second pressure force is developed.

In copending U.S. application Ser. No. 481,433, filed June 20, 1974, it is disclosed how a stepped diameter piston can sequentially produce a first pressure force and a second pressure force when a control valve is operated by movement of a plunger connected to an input rod to transfer the output from the movement of the wall acting through a first diameter to a second diameter and thereby produce an added output potential.

SUMMARY OF THE INVENTION

I have devised a power braking system wherein a first piston is attached to the movable wall of a servomotor for transmitting an operational force to operate the wheel brakes. A second piston is located on the first piston between a first stop and a second stop. A spring holds the second piston against the first stop. A first valve located in an axial flow path controls communication between a pressurizing chamber and an outlet chamber. A first actuator attached to the second piston will close a ball valve when the first hydraulic pressure developed by the second piston moving in the pressurizing chamber is sufficient to overcome the spring. As the first hydraulic pressure is increased, the ball valve will open to allow communication between the pressurizing chamber and the output chamber. When vacuum runout occurs, a further input will be transferred through a plunger to open a poppet valve to proportionally release a portion of the first hydraulic pressure into a relief chamber and allow the movable wall to move the first piston in the outlet chamber to produce a second hydraulic pressurizing force for operating the wheel brakes.

It is therefore an object of this invention to provide a power braking system with means for transferring an operational output from a floating piston to piston fixed to a movable wall in the servometer to sequentially produce a first fluid pressure and a second fluid pressure.

It is another object of this invention to provide a servomotor with an output produced by selectively moving a first piston and a concentric second piston within a stepped diameter bore with a first actuation means for operating a first valve and a second actuation means for operating a second valve to provide a first operational force and a second operational force for operating the wheel brakes in a braking system.

It is another object of this invention to provide a servomotor with power producing means having a floating piston to modify the incremental transitions which can occur during the transfer of an input to a second piston.

These and other objects will become apparent from reading this specification and viewing the drawings.

BRIEF DESCRIPTION OF THE DRAWINGS

FIG. 1 is a schematic illustration of a power braking system with a sectional view of a servomotor incorporating the invention of this application.

FIG. 2 is a sectional view of a control means for transferring an operational force from a first piston to a second piston.

FIG. 3 is another embodiment of a control means similar to that of FIG. 2.

DETAILED DESCRIPTION OF THE PREFERRED EMBODIMENT

The braking system 10, shown in FIG. 1, has a fluid pressure servomotor 12 connected to a master cylinder 14 for supplying the front wheel brakes 16 and the rear wheel brakes 18 with an operational hydraulic force in response to an input force applied to pedal 20 by an operator.

The fluid pressure servomotor 12 has a first shell 22 joined to a second shell 24 by a twist lock arrangement 26. A movable wall means 28 is located within the first shell 22 and the second shell 24 to form a first variable volume chamber 30 and a second variable volume chamber 32. The wall means 28 has a central hub means 34 to which a backing plate 36 is attached by fingers 38. A diaphragm 40 has a first bead 42 on its periphery which is held between flange 44 and flange 46 on the first shell 22 and the second shell 24, respectively, and a second bead 48 which is snapped onto lip 50 of the backing plate 36.

The hub 34 has a rearwardly extending projection 52 which extends through opening 54 in the second shell. The rearward projection 52 has an axial bore 56 into which a control valve means 58 is located for receiving an operational input from pedal 20 through push rod 60.

The control valve means 58 has a vacuum poppet assembly 62 and an atmospheric poppet assembly 64 which are sequentially operated upon movement of plunger 66 by the push rod 60.

The vacuum poppet assembly 62 has a face 68 separated from a fixed bead 70 by a flexible section 72. The bead 70 is secured within bore 56 by a retainer 74 which surrounds the push rod 60. A first spring 76 urges the face 68 toward a vacuum seat 78 adjacent vacuum passage 80. The vacuum passage 80 connects the first chamber 30 with the interior 56 of the hub means 34.

The atmospheric poppet 64 has a cylindrical section 82 which is positioned within the bore 56 by a plurality of projections 84. The projections 84 guide a first atmospheric seat 86 into contact with face 68. An annular projection 88 extends inwardly from the cylindrical projection toward the push rod 60. One side of the projection 88 forms a second atmospheric seat 90 which is urged toward a rearward projection 92 on plunger 66 by spring 94 secured between retainer 74 and push rod 60. Another spring 96 is caged between retainer 74 and plate 98 to return and hold land 100 on plunger 66 against snap ring 102 in the hub means 34. A return spring 104 located in the second shell 24 acts on the hub means 34 to hold bumper 106 against shell 22. In this position vacuum that is communicated from the intake manifold of the vehicle through check valve 108 into the first chamber 30 will evacuate any air present in the second chamber 32 by way of passage 110 into bore 56 and out passage 80 to vacuum suspended wall means 28.

A ratio changer means 112 has a first piston means 114 secured to the hub 34 which extends through a first diameter section 116 into a second smaller diameter section 118 of bore 120 in the master cylinder 14. The first piston means 114 has an axial flow path or passageway 122 extending therethrough. The axial flow path 122 is connected to the first diameter section 116 by a first radial passage 124 and a second radial flow path 126. A control chamber 128 is located between the first radial passage 124 and the second radial passage 126. A first shoulder 130 provides a first stop for a second piston 132 which is concentric to and carried on the peripheral surface 134 of the first piston means 114. A snap ring 136 limits the movement of the second piston 132 on the peripheral surface. The second piston 132 separates the first diameter 116 into a pressurizing chamber 138 and a relief chamber 140. A spring 142 located in the relief chamber 140 and connected to the first piston means 114 urges the second piston 132 against the shoulder 130 to assure communication between the relief chamber 140 and the reservoir 144 through port 146. At the same time the pressurizing chamber 138 is in communication with the reservoir 144 through port 148.

A first valve means 150 has a ball 152 which is located within the axial passageway 122 which is urged toward a seat 154 by spring 156. The first valve means 150 will regulate the communication of hydraulic fluid between the pressurizing chamber 138 and the output chamber 158.

A first actuator means 160 has a pin 162 which extends through a slot 164 in the first piston 114 and is fixed to the second piston 132. A stem 166 which extends from the pin 162 engages and holds the ball 152 away from seat 154 when the spring 142 holds the second piston 132 against stop 130 to allow free communication between the pressurizing chamber 138 and the outlet chamber 158.

A second valve means 168 is located in the control chamber 128 adjacent the second axial passage 126 to control communication between the pressurizing chamber 138 and the relief chamber 140. The second valve means 168 has a poppet member 170 which is held against a seat 172 by a spring 174. The poppet member 170 has a stem 175 which extends through guide surface 176 into an actuation chamber 178.

A resilient means 180 is located in the actuation chamber 178 adjacent the guide surface 176.

A second actuator means 182 having a plunger 184 which is located in the axial bore 186 which extends from the axial flow path or passageway 122 has a cylindrical surface 188 which abuts the resilient means 180 and a stepped end 190 which extends through the reaction disc 192 of the servomotor 12. Seals 194 and 196 prevent the hydraulic fluid in the first diameter section 116 and the axial passage 122 from entering the first chamber 30 of the servomotor 12.

MODE OF OPERATION OF THE PREFERRED EMBODIMENT

When an operator applies an input force to pedal 20, push rod 60 will move to allow spring 76 to move face 68 of the vacuum poppet means 62 on to vacuum seat 78 to interrupt communication between the first chamber 30 and bore 56 through passage 80. Further movement of the push rod 60 will move the first atmospheric seat 86 away from face 68 to allow air at atmospheric pressure present in bore 56 to enter the rear chamber 32 through passage 110. With air in the rear chamber 32 and vacuum in the front chamber 30, a pressure differential will be created across the wall means 28. This pressure differential will create an operational force which will be transmitted through the hub means 34 to move the first piston means 114 in bore 120 of the master cylinder 14. Initial movement of piston 114 will allow spring 142 to move piston 132 past port 148 to build up a first hydraulic pressure which is freely communicated between the pressurizing chamber 138 and the outlet chamber 158 for transmission to the wheel brakes 16 and 18 by way of conduits 198 and 200, respectively, in a manner described in U.S. application Ser. No. 481,433, filed June 20, 1974. As the first hydraulic fluid pressure increases, spring 142 will be overcome and the input from the servomotor transmitted to the second piston 132 through the stop or snap ring 136. As piston 132 moves toward stop 136, stem 164 is moved away from ball 152 allowing spring 156 to urge ball 152 toward seat 154 in opposition to the hydraulic fluid pressure being developed to establish a first mode of operation.

When vacuum runout occurs, spring 156 will have seated ball 152 on seat 154 to terminate communication between the pressurizing chamber 138 and the outlet chamber 158. Any further input force from the operator is transmitted through the first plunger 66 directly to end 190 of plunger 184. This additional force after overcoming bumper 180 will engage stem 175 to open the poppet means 168 and proportionally allow a portion of the first hydraulic fluid pressure to escape through the second radial passage 126 into the relief chamber 140. In a direct relationship to this change in hydraulic fluid pressure in the pressurizing chamber 138, the pressure differential acting on wall means 28 will move the first piston 114 in the second diameter section 118 to increase the hydraulic fluid pressure therein and provide the wheel brakes with a second fluid pressure in a second mode of operation.

Upon a reduction of the input force, plunger 184 will move out of contact with stem 175 to allow spring 174 to seat poppet 170 on seat 172 and terminate communication between the control chamber 138 and the relief chamber 140. At the same time the second hydraulic pressure will act on piston 114 while the hydraulic pressure in chamber 138 is reduced to a point where spring 142 can move piston 132 against stop 130. As piston 132 approaches stop 130, stem 166 engages ball 152 to provide communication between the outlet chamber 158 and the pressurizing chamber 138 to equalize the hydraulic fluid pressure therebetween to a point where piston 132 is again moved toward stop 136.

Upon termination of the input force, spring 96 moves plunger 66 against the air poppet 64 to allow the vacuum in chamber 30 to evacuate air from the chamber 32. At the same time spring 104 moves the hub 34 toward the rear shell, since the piston is rigidly attached thereto, stop 130 will engage the second piston 132 causing stem 166 to hold ball 152 away from seat 154 to allow any hydraulic fluid in the outlet chamber 158 to escape into the reservoir.

In the embodiment shown in FIGS. 2 and 3, the like elements performing the same as in FIG. 1 are not numbered.

In FIG. 2, the first actuator means 260 includes a projection 262 which extends from piston 232. A lever 264 has a slot on one end thereof which is biased against the projection 262 by a spring 266 on the end of a pin 268. A stem 270 is attached to the end 272 of the lever 264 to hold ball 152 away from seat 154 in opposition to spring 156.

The second actuator means 282 has a lever 284 which has a slot on one end thereof which is resiliently biased against piston 214 by a spring 286 on pin 288.

As the relative movement between pistons 214 and 232 increases with wear, the first and second actuator means 260 and 282 can compensate by moving on projection 262 and piston 214 against the resistance of springs 266 and 286 to maintain the sequential timing required for operating the valves 150 and 168.

In the embodiment shown in FIG. 3, the first actuator 360 is connected to the second actuator 382 by an interconnecting first U-shaped member 362 and a second U-shaped member 383. The first U-shaped member 362 is resiliently held within the second U-shaped member 383 and can compensate for changes in relatively minor changes in actuation losses by moving to maintain the sequential actuation of the first valve by stem 364 and the second valve by stem 378.

Thus, I have provided a power braking system with means for positively maintaining free communication between a pressurizing chamber and an output chamber during periods wherein a hydraulic lock up could occur while maintaining segregation therebetween during periods wherein a high pressure is required to operate the wheel brakes.

I claim:

1. In a power braking system having a servomotor with a wall moved by a pressure differential acting thereacross for supplying an operational force to activate the wheel brakes in response to an input force in a first mode of operation, control means for modifying the operational force in response to an input force in a second mode of operation, said control means comprising:

a housing having a bore therein with a first diameter section connected to a reservoir by a first port and a second port and a second diameter section connected to said wheel brakes;

first piston means connected to said wall and extending through said first diameter section to establish an output chamber in the second diameter section, said output chamber being connected by an axial flow path to the first diameter section through a first axial passage and a second axial passage, said axial flow path having a control chamber located between the first axial passage and the second axial passage;

second piston means concentric to and located between a first stop and a second stop on the first piston means for separating the first diameter section into a pressurizing chamber and a relief chamber;

resilient means connected to the first piston for urging said second piston means toward said first stop;

first valve means located with said axial flow path for controlling communication between the pressurizing chamber and the output chamber;

second valve means located within said axial flow path for controlling communication between the pressurizing chamber and the relief chamber;

first actuator means located within the axial flow path and moved away from the first valve means when the first pressurizing force moves the second piston means against the second stop in opposition to the resilient means during the first mode of operation, said first pressurizing force opening said first valve means to supply the wheel brakes with an actuation force; and second actuator means responsive to said input force in the second mode of operation to move the second valve allowing said first pressurizing force present in the pressurizing chamber to proportionally escape into the relief chamber as a function of the input force and allow the pressure differential force acting on the wall to move the first piston in the output chamber to develop a second pressurizing force for activating the wheel brakes in the second mode of operation, said resilient means moving said second piston toward said first stop upon termination of said second mode causing said first actuator means to open said first valve means and establish unhampered communication between the output chamber and the pressurizing chamber.

2. In the power braking system, as recited in claim 1, wherein said first actuator means includes:

pin means extending through slots in the first piston means into a fixed position in the second piston means; and first stem means attached to said pin means for engaging said first valve means upon movement of said second piston against the first stop by the resilient means.

3. In the power braking system, as recited in claim 2, wherein said first valve means includes:

ball means located in said axial flow path; and second resilient means secured to said first piston means for urging said ball means toward a seat and first stem means in the axial flow path, said first stem means holding said ball means away from said seat in opposition to the second resilient means when the second piston is against the first stop, said first pressurizing force moving said ball means away from said seat in opposition to the second resilient means in said first mode of operation, said second resilient means holding said ball means against said seat to prevent communication between said output chamber and said pressurizing chamber during said second mode of operation.

4. In the power braking system, as recited in claim 3, wherein said second valve means includes:
poppet means located in the control chamber within said axial flow path between the first axial passage and the second axial passage;
third resilient means connected to said first piston means for urging said poppet means toward a seat surrounding the axial passageway; and
second stem means connected to said poppet means for engaging said input means for moving said poppet means away from said seat in said second mode of operation to allow communication between the control chamber and the relief chamber in the second mode of operation.

5. In the power braking system, as recited in claim 4, wherein said input means includes:
plunger means located within said axial bore extending from the axial flow path for moving said second stem during said second mode of operation.

6. In the power braking system, as recited in claim 5, wherein said input means includes:
bumper means located within said axial passageway for preventing said plunger means from moving said second stem means until said first mode of operation has been terminated.

7. In the power braking system, as recited in claim 1, wherein said first actuation means includes:
projection means extendng from said second piston means;
lever means having a first end with a slot therein and a second end for operating the first valve means; and
pin means extending through said slot for biasing said first end against said projection means to limit the relative movement therebetween, said lever means moving with said second piston to operate the first valve means.

8. In the power braking system, as recited in claim 7, wherein said first valve means includes:
ball means located in said flow path for regulating the flow of hydraulic fluid between the pressurizing chamber and the output chamber;
resilient means located in said flow path for urging said said ball means toward a seat therein initially in opposition to said lever means and later to said hydraulic fluid pressure as the first and second pistons move relative to each other.

9. In the power braking system, as recited in claim 8, wherein said first actuation means includes:
a first U-shaped member which is resiliently biased to compensate for changes in tolerance within the second mode of operation to maintain the actuation sequence of the first valve means.

10. In the power braking system, as recited in claim 9, wherein said second actuation means includes:
a second U-shaped member surrounding the first U-shaped member to compensate the second valve means for changes in the actuation sequence of the second valve means.

* * * * *